US008005919B2

(12) United States Patent
Mehanna et al.

(10) Patent No.: US 8,005,919 B2
(45) Date of Patent: Aug. 23, 2011

(54) HOST-BASED INTELLIGENT RESULTS RELATED TO A CHARACTER STREAM

(75) Inventors: Lara Mehanna, Arlington, VA (US); Shawkat Hasan, Dulles, VA (US); Harmannus Vandermolen, Dulles, VA (US); Gerald Campbell, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1274 days.

(21) Appl. No.: 10/651,303

(22) Filed: Aug. 29, 2003

(65) Prior Publication Data

US 2007/0288648 A1   Dec. 13, 2007

Related U.S. Application Data

(60) Provisional application No. 60/426,806, filed on Nov. 18, 2002, provisional application No. 60/427,944, filed on Nov. 21, 2002, provisional application No. 60/471,337, filed on May 19, 2003, provisional application No. 60/471,338, filed on May 19, 2003, provisional application No. 60/488,400, filed on Jul. 21, 2003.

(51) Int. Cl.
*G06F 15/16* (2006.01)

(52) U.S. Cl. ........................................ 709/217; 709/219

(58) Field of Classification Search .................. 707/3, 4, 707/5, 10
See application file for complete search history.

(56) References Cited

U.S. PATENT DOCUMENTS

| 4,650,927 | A |   | 3/1987  | James |
| 4,817,129 | A |   | 3/1989  | Riskin |
| 5,592,538 | A |   | 1/1997  | Kosowsky et al. |
| 5,749,081 | A |   | 5/1998  | Whiteis et al. |
| 5,799,284 | A | * | 8/1998  | Bourquin ........................ 705/26 |
| 5,835,905 | A |   | 11/1998 | Pirolli et al. |
| 5,845,300 | A | * | 12/1998 | Comer et al. .................. 715/508 |
| 5,870,744 | A |   | 2/1999  | Sprague |
| 5,895,454 | A | * | 4/1999  | Harrington ...................... 705/26 |
| 5,896,321 | A | * | 4/1999  | Miller et al. ............. 365/189.01 |
| 5,913,032 | A |   | 6/1999  | Schwartz et al. |
| 5,950,193 | A |   | 9/1999  | Kulkarni |
| 5,960,429 | A |   | 9/1999  | Peercy et al. |
| 5,999,932 | A |   | 12/1999 | Paul |
| 6,041,311 | A |   | 3/2000  | Chislenko et al. |
| 6,092,049 | A |   | 7/2000  | Chislenko et al. |

(Continued)

FOREIGN PATENT DOCUMENTS

EP    1054329 A2 * 11/2000

(Continued)

OTHER PUBLICATIONS

"Index of /tarvizo/OldFiles/elips/tnt-2.4", Jul. 2, 2001, TNT, http://web.mit.edu/tarvizo/OldFiles/elips/tnt-2.4/.*
Supplementary European Search Report dated Jul. 6, 2006 for Application No. EP 03 81 1631, 3 pages.
Bryan Pfaffenberger, Newscape Navigator Gold, AP Professional, 1997.
Automated feature of Internet Explorer, www.geocities.com/technofundo/tech/web/ie_autocomplete.html, pp. 1-6.

(Continued)

*Primary Examiner* — Jeffrey R Swearingen
(74) *Attorney, Agent, or Firm* — Fish & Richardson P.C.

(57) ABSTRACT

Information may be presented to a user by using a first application to receive a character stream of one or more noncompletion characters. The noncompletion characters indicate that additional characters may be received. The character stream is exchanged with a host that analyzes the character stream to generate results that are responsive to the user's predicted interest. Results are received and displayed so that the user may select one of the results to launch a code segment related to the selected result.

98 Claims, 10 Drawing Sheets

U.S. PATENT DOCUMENTS

| | | | |
|---|---|---|---|
| 6,157,618 A * | 12/2000 | Boss et al. ..................... 709/224 | |
| 6,189,026 B1 | 2/2001 | Birrell et al. | |
| 6,208,996 B1 | 3/2001 | Ben-Shachar et al. | |
| 6,237,092 B1 | 5/2001 | Hayes, Jr. | |
| 6,247,043 B1 | 6/2001 | Bates et al. | |
| 6,260,148 B1 | 7/2001 | Aggarwal et al. | |
| 6,269,369 B1 | 7/2001 | Robertson | |
| 6,292,743 B1 * | 9/2001 | Pu et al. ......................... 701/202 | |
| 6,301,609 B1 * | 10/2001 | Aravamudan et al. ........ 709/207 | |
| 6,327,590 B1 | 12/2001 | Chidlovskii et al. | |
| 6,349,299 B1 | 2/2002 | Spencer et al. | |
| 6,360,251 B1 | 3/2002 | Fujita et al. | |
| 6,392,669 B1 | 5/2002 | Matoba et al. | |
| 6,430,604 B1 | 8/2002 | Ogle et al. | |
| 6,457,044 B1 | 9/2002 | IwaZaki | |
| 6,463,471 B1 | 10/2002 | Dreke et al. | |
| 6,466,918 B1 | 10/2002 | Spiegel et al. | |
| 6,529,903 B2 | 3/2003 | Smith et al. | |
| 6,549,933 B1 | 4/2003 | Barrett et al. | |
| 6,549,937 B1 | 4/2003 | Auerbach et al. | |
| 6,564,213 B1 | 5/2003 | Ortega et al. | |
| 6,564,264 B1 | 5/2003 | Creswell et al. | |
| 6,567,796 B1 | 5/2003 | Yost et al. | |
| 6,606,657 B1 | 8/2003 | Zilberstein et al. | |
| 6,615,237 B1 * | 9/2003 | Kyne et al. ..................... 709/203 | |
| 6,643,669 B1 | 11/2003 | Novak et al. | |
| 6,647,383 B1 * | 11/2003 | August et al. ..................... 707/3 | |
| 6,677,968 B1 | 1/2004 | Appelman | |
| 6,687,362 B1 | 2/2004 | Lindquist et al. | |
| 6,694,353 B2 | 2/2004 | Sommerer | |
| 6,701,348 B2 | 3/2004 | Sommerer | |
| 6,704,727 B1 * | 3/2004 | Kravets ............................. 707/5 | |
| 6,711,565 B1 * | 3/2004 | Subramaniam et al. .......... 707/3 | |
| 6,714,791 B2 | 3/2004 | Friedman | |
| 6,750,881 B1 | 6/2004 | Appelman | |
| 6,751,603 B1 * | 6/2004 | Bauer et al. ....................... 707/1 | |
| 6,829,607 B1 * | 12/2004 | Tafoya et al. ..................... 707/6 | |
| 6,848,542 B2 * | 2/2005 | Gailey et al. ............. 707/E17.11 | |
| 6,853,982 B2 | 2/2005 | Smith et al. | |
| 6,912,505 B2 | 6/2005 | Linden et al. | |
| 6,912,564 B1 | 6/2005 | Appelman et al. | |
| 6,999,959 B1 | 2/2006 | Lawrence et al. | |
| 7,007,008 B2 | 2/2006 | Goel et al. | |
| 7,007,228 B1 * | 2/2006 | Carro ............................... 707/3 | |
| 7,031,961 B2 | 4/2006 | Pitkow et al. | |
| 7,035,865 B2 | 4/2006 | Doss et al. | |
| 7,058,690 B2 | 6/2006 | Maehiro | |
| 7,089,237 B2 | 8/2006 | Turnbull et al. | |
| 7,096,214 B1 | 8/2006 | Bharat et al. | |
| 7,146,416 B1 | 12/2006 | Yoo et al. | |
| 7,185,059 B2 | 2/2007 | Daniell et al. | |
| 7,275,215 B2 | 9/2007 | Werndorfer et al. | |
| 7,370,035 B2 * | 5/2008 | Gross et al. ....................... 707/3 | |
| 7,424,510 B2 * | 9/2008 | Gross et al. ..................... 709/203 | |
| 2001/0002469 A1 | 5/2001 | Bates et al. | |
| 2002/0049610 A1 | 4/2002 | Gropper | |
| 2002/0049704 A1 | 4/2002 | Vanderveldt et al. | |
| 2002/0049751 A1 | 4/2002 | Chen et al. | |
| 2002/0052921 A1 | 5/2002 | Morkel | |
| 2002/0059401 A1 * | 5/2002 | Austin ........................... 709/219 | |
| 2002/0097856 A1 | 7/2002 | Wullert, II | |
| 2002/0116528 A1 | 8/2002 | Vale | |
| 2002/0123988 A1 | 9/2002 | Dean et al. | |
| 2002/0138650 A1 * | 9/2002 | Yamamoto et al. ........... 709/245 | |
| 2002/0169748 A1 | 11/2002 | Macholda | |
| 2002/0184128 A1 | 12/2002 | Holtsinger | |
| 2003/0009385 A1 | 1/2003 | Tucciarone et al. | |
| 2003/0046097 A1 | 3/2003 | LaSalle et al. | |
| 2003/0054830 A1 | 3/2003 | Williams et al. | |
| 2003/0058478 A1 | 3/2003 | Aoki | |
| 2003/0105682 A1 | 6/2003 | Dicker et al. | |
| 2003/0105822 A1 | 6/2003 | Gusler et al. | |
| 2003/0119561 A1 | 6/2003 | Hatch et al. | |
| 2003/0158860 A1 | 8/2003 | Caughey | |
| 2003/0177175 A1 | 9/2003 | Worley et al. | |
| 2003/0220946 A1 | 11/2003 | Malik | |
| 2003/0220976 A1 | 11/2003 | Malik | |
| 2004/0029572 A1 | 2/2004 | Nerot | |
| 2004/0030741 A1 * | 2/2004 | Wolton et al. ................. 709/202 | |
| 2004/0044536 A1 | 3/2004 | Fitzpatrick et al. | |
| 2004/0044736 A1 | 3/2004 | Austin-Lane et al. | |
| 2004/0054646 A1 | 3/2004 | Daniell et al. | |
| 2004/0054736 A1 | 3/2004 | Daniell et al. | |
| 2004/0059708 A1 | 3/2004 | Dean et al. | |
| 2004/0133564 A1 * | 7/2004 | Gross et al. ......................... 707/3 | |
| 2004/0143564 A1 * | 7/2004 | Gross et al. ......................... 707/1 | |
| 2004/0148347 A1 | 7/2004 | Appelman et al. | |
| 2004/0204140 A1 | 10/2004 | Nagata | |
| 2004/0215793 A1 | 10/2004 | Ryan et al. | |
| 2004/0267604 A1 | 12/2004 | Gross et al. | |
| 2005/0071251 A1 | 3/2005 | Linden et al. | |
| 2005/0102202 A1 | 5/2005 | Linden et al. | |
| 2006/0259476 A1 | 11/2006 | Kadayam et al. | |

FOREIGN PATENT DOCUMENTS

| | | | |
|---|---|---|---|
| JP | 4-86950 | | 3/1992 |
| JP | 08-123821 | | 5/1996 |
| JP | 9-247334 | | 9/1997 |
| JP | 11-161682 | | 6/1999 |
| JP | 11-328194 | | 11/1999 |
| JP | 2000-148795 | | 5/2000 |
| JP | 2000-222424 | | 8/2000 |
| JP | 2001-109752 | | 4/2001 |
| JP | 2002-7479 | | 1/2002 |
| JP | 2002-132832 | | 5/2002 |
| JP | 2002-175301 | | 6/2002 |
| KR | 2001048800 A | * | 6/2001 |
| WO | WO 01/80079 | | 10/2001 |
| WO | WO0180079 A2 | * | 10/2001 |
| WO | WO 02093400 | | 11/2002 |
| WO | WO 02093875 | | 11/2002 |

OTHER PUBLICATIONS

Mozilla, www.mozilla.org/projects/ml/autocomplete, Mar. 13, 2003.

International Search Report, PCT/US03/36656, dated Apr. 22, 2004.

Jennifer 8. Lee, "From 100 countries, a Google snapshot of what's going on," International Herald Tribune, Nov. 29, 2002, pp. 1-3, http://www.iht.com.

Yahoo! Buzz Index, Feb. 13, 2003, 1 page, http://buzz.yahoo.com/overall/.

Danny Sullivan, "What People Search for," Search Engine Watch, pp. 1-4, http://searchenginewatch.com/facts/searches.html (visited Feb. 13, 2003).

"Google Zeitgeist—Search patterns, trends, and surprises according to Google," Jan. 2003, pp. 1-2, http://www.google.com/press/zeitgeist.html (visited Feb. 13, 2003).

Yahoo! Buzz Index, Nov. 10, 2002, 1 page.

Yahoo! Messenger, "Messenger Help," (4 total pages).

Cerulean Studios, "Trillian Pro: No Boundaries," (Overview, New Features, Tech Specs, Corporate, Product Tour—16 total pages).

Cerulean Studios, "Trillian: Your Freedom to Chat," (Overview, Features, Screenshots, Tech Specs—8 total pages).

European Office Action, Application Serial No. 03 811 631.5-2201, dated Oct. 4, 2006, 4 pages.

Office Action mailed Apr. 26, 2007 issued in U.S. Appl. No. 10/715,213, 15 pages.

Office Action mailed Sep. 27, 2007, in U.S. Appl. No. 10/715,213, 14 pages.

Morikawa, et al., "Part 2 Build up a Comfortable Search Environment via Customization by Rules," PC Japan, vol. 7, No. 10, pp. 172-176, in Japanese with a partial English translation of p. 172.

Komatsu et al., "Text Input with Dynamic Abbreviation Expansion,." IPSJ SIG Notes, vol. 2001, No. 87, Sep. 14, 2008, pp. 133-138, in Japanese with a partial English translation.

English translation of an Office Action issued in corresponding Japanese Application No. 2004-570418 on Aug. 7, 2008.

English translation of an Office Action issued in corresponding Japanese Application No. 2004-570418 on Feb. 5, 2009.

Office Action mailed Aug. 7, 2008, in U.S. Appl. No. 10/715,213.

Office Action mailed Feb. 5, 2009 in U.S. Appl. No. 10/715,213.

Office Action for U.S. Appl. No. 10/715,216, mailed Aug. 18, 2009.

* cited by examiner

HOST-BASED INTELLIGENT RESULTS RELATED TO A CHARACTER STREAM

CROSS-REFERENCE TO RELATED APPLICATIONS

This application claims priority to U.S. Provisional Application No. 60/426,806, titled "Software Enabling and Enhancing Communications and Functionality At A Client Computer" and filed Nov. 18, 2002; U.S. Provisional Application No. 60/427,944, titled "Keyword and Search Navigation" and filed Nov. 21, 2002; U.S. Provisional Application No. 60/471,337, titled "Smart Box" and filed May 19, 2003; U.S. Provisional Application No. 60/471,338, titled "Smart Box" and filed May 19, 2003; and U.S. Provisional Application No. 60/488,400, titled "Smartbox", and filed Jul. 21, 2003. Each of these applications is incorporated by reference.

TECHNICAL FIELD

This document relates to content retrieval and presentation.

BACKGROUND

The Internet enables users to access a great amount of information. A user with a web browser, messaging application, or other proprietary application may retrieve information from large libraries to access great amounts of information. Navigating the great amount of information can challenge some users.

SUMMARY

In one general sense, information may be presented to a user by using a first application to receive a character stream of one or more non-completion characters that indicate that additional characters may be received, exchanging the character stream with a host to analyze the character stream to generate results that are responsive to the user's predicted interest, receiving the results, and displaying the results so that the user may select one of the results to launch a code segment related to a selected result.

For example, a web browser may receive the character stream in an address line and exchange the character stream with a host that generates mapping results that are responsive to the user's predictive interest. The web browser receives the mapping results and displays the mapping results with an overview map so that the user may select one of the overview maps to display more detailed mapping information.

Implementations may include one or more of the following features. For example, the first application may receive one or more updates to the character stream, and may exchange the updates to the character stream with the host to permit the host to analyze the character stream using the updates to generate updated results that are responsive to the user's predicted interest. The updated results may be received and displayed so that the user may select one of the updated results to launch a code segment related to a selected result.

Exchanging the updates may include exchanging all of the characters in the character stream, or exchanging one or more characters in the character stream that have been received since the character stream was last exchanged.

Exchanging the character stream may include determining whether a sufficient amount of data in the character stream exists to generate accurate results, and, if so, analyzing the character stream to display the results.

Analyzing the character stream may be delayed when there is an insufficient amount of data in the character stream to generate accurate results. Determining whether the sufficient amount of data exists in the character stream may include waiting until a predetermined number of characters has been entered, waiting until a predetermined amount of time has elapsed since the user last entered a character in the character stream, or waiting until the predetermined number of characters has been entered, unless the predetermined amount of time has elapsed since a last character in the character stream has been entered.

Analyzing the character stream may include identifying results that are more responsive to the predicted interest of the user. Displaying the results may include displaying the results that are more responsive to the predicted interest of the user.

Displaying the results so that the user may select one of the results to launch a code segment may include enabling the user to launch a second application that is different from the first application that receives the character stream. Exchanging the character stream with a host may include polling multiple databases to identify results from each of the multiple databases.

The user may be enabled to configure the first application to control an operating mode of the first application. For example, the user may be enabled to select one or more databases to be accessed, to control a format with which the results are displayed, or to control a configuration for a drop down menu used to display results.

The character stream may be analyzed to determine a user profile, which may be stored and used to analyze subsequent character streams from the first application.

Displaying the results may include displaying a map related to the character stream. Using the first application to receive the character stream may include analyzing the character stream before exchanging the character stream to identify that map information is related to the character stream. Analyzing the character stream may include recognizing that a commonly used address term, such as a zip code, a state identifier or a city identifier, is present in the character stream.

Using the first application to receive the character stream may include analyzing the character stream before exchanging the character stream to identify that vendor information is related to the character stream, and instructing the host to return vendor information in the results. Identifying vendor information may include identifying yellow page information related to the character stream or a category and a location appearing in the character stream.

The character stream may be analyzed for a messaging label appearing in the character stream. Analyzing the character stream for the messaging label and displaying the results may include presenting a messaging code segment that enables the user to communicate with another user.

Analyzing the character stream may include determining that a user identifier appears in the character stream. When such a user identifier appears, an online status of a user associated with the user identifier may be determined. Determining the online status and displaying the results may include enabling the user to exchange an instant message with the user associated with the user identifier. Analyzing the character stream for the messaging label may include recognizing that an '@' character appears in the character stream as an indication that an electronic mail message will be exchanged.

The results may be stored for subsequent access. Storing the results includes storing the results the user has selected. A first application may be used to receive a second stream of one or more non-completion characters where the non-completion characters indicate that additional characters may be received. The stored results may be accessed and related to the second stream.

The stored results may be displayed when the second stream indicates that the user is requesting information related to the stored results. The second stream may be exchanged with the host to analyze the second stream. Second stream results may be received and displayed so that the user may select one of the second stream results to launch a code segment related to the second stream result, when the stored results do not relate to the second stream. The operations described previously may be performed on a client or a host system.

The details of one or more implementations are set forth in the accompanying drawings and the description below. Other features will be apparent from the description and drawings, and from the claims.

DETAILED DESCRIPTION

Figure 1:
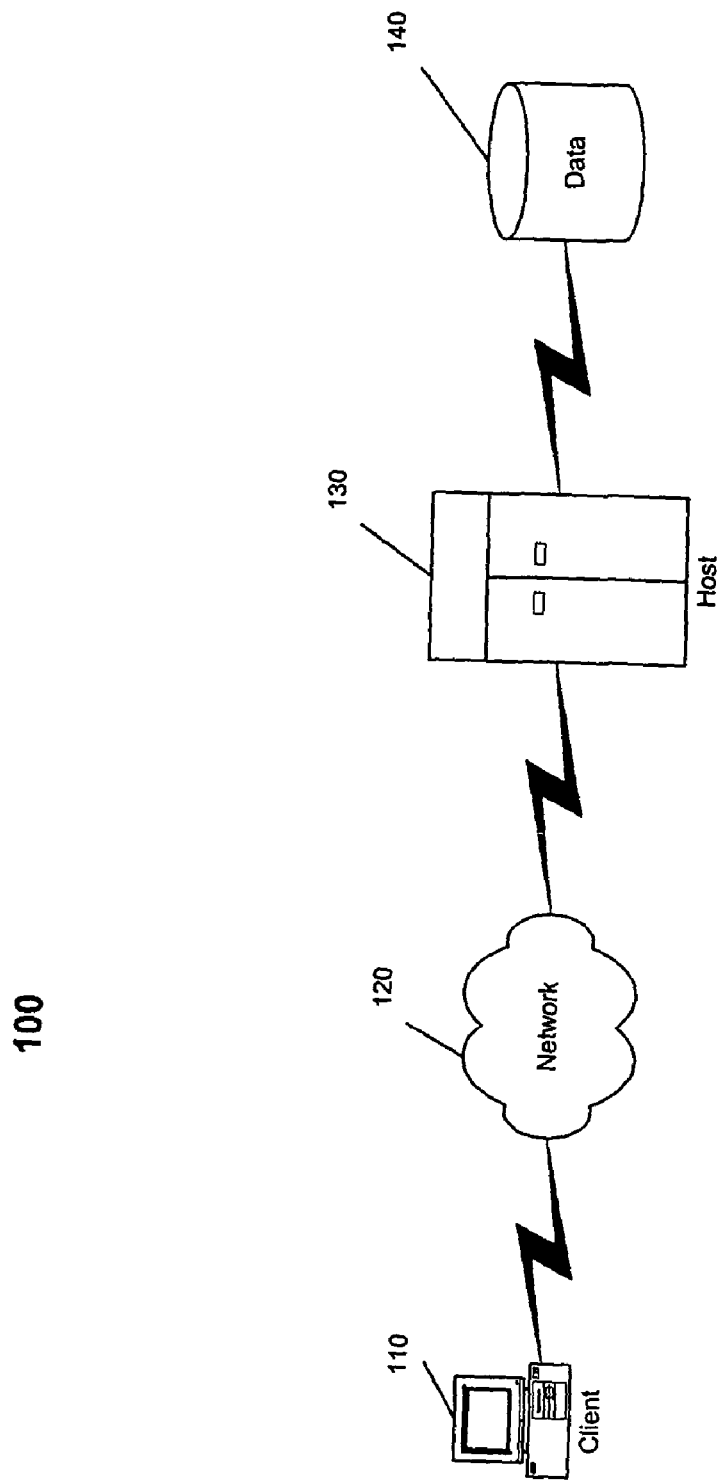
FIG. 1 illustrates a communications system that may be used to intelligently present results related to a character stream analyzed by a host.

The Internet enables access to large volumes of content. A key challenge in providing a better access experience for users is enabling the users to access information most relevant to their interests with the least amount of effort in retrieving the results.

To assist users, an application enables users to enter a character stream into an application such as a web browser. The character stream includes noncompletion characters, which are characters that the user types in a field or form before entering a completion character such as a carriage return (e.g., the 'Enter' key). The application may exchange this character stream with a host so that the host may analyze the character stream. The host analyzes the character stream, and generates results predicted to be of interest to the user. For example, when the character stream includes the string "plumbe", the host may generate access to a yellow page database and retrieve a list of plumbers available to support the user. Note that the results may be identified without waiting to receive the completed character stream for "plumber" or "plumber (carriage return)".

In another example, the user may enter "20005" as a character stream. The host may retrieve maps and business references located in the area of Washington, D.C. that lies within zip code 20005. Note that in this example, the user did not identify a mapping label or include the words "zip code" to retrieve the results for zip code 20005. Rather, the character stream is analyzed so that potential mapping results may be considered and/or displayed.

In any event, regardless of the results that are identified on the host, the results are returned to the client, which then may display all or a portion of the results. The results are displayed in such a manner that the user may select one of the results to launch a code segment related to the selected item. For example, if the displayed results include a list of plumbers available to support the user, selecting one of the entries may launch a web page operated by a particular plumber. In another example, a phone call, an electronic mail message or an instant message may be transmitted to the plumber whose entry was selected from the list of results.

The user may continue to enter one or more characters in the character stream, and the results may be modified based on recently received characters. For example, when a character stream is analyzed initially after entering "spring", results related to the season of spring and products using the term "spring" may be returned. When the user types an "f" character, the "f" character may be transmitted to the host, which in turn generates results related to "springf". In one example, the previous results related to "spring" are filtered to generate a new list that only includes content related to "springf". In another example, a new query is run identifying terms related to "springf".

Regardless of how the query is structured, the host identifies results related to "springf", which may include one or more selections related to cities and towns named Springfield. Results for multiple towns may be presented in a portion of the application that the user is accessing. In one example, the user may be allowed to select one of the results to generate a map related to the selected Springfield. In another example, the user may be presented with entries for "Springfield, MA" and "Springfield, IL." The user may continue typing characters in the character stream. When the user types in an "I" character after "Springfield" has been identified, the "Springfield, MA" entry may be removed. The user then may select the "Springfield, IL" entry to retrieve a map of Springfield, Ill.

FIG. 1 shows a communications system 100 that enables intelligent presentation of results related to a character stream. Generally, a client 110 exchanges communications relating to a character stream of noncompletion character with a host 130 using network 120. The host 130 analyzes the character stream to generate results related to the character stream using, for example, a database 140 (e.g., a yellow pages directory or a mapping system). The host 130 provides one or more results to the client 110, which in turn displays the results.

Generally, the client 110 includes a computing device that enables a user to exchange information over a communications network. The client 110 may include one or more devices capable of accessing content on the host 130. The client 110 also may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client)

capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 includes one or more character stream code segments that analyze a character stream input to an information retrieval application. The character stream code segment receives the stream and structures the exchange of the character stream with other software applications on the client 110 and/or host 130. For example, the character stream code segment may wait initially wait until X initial characters are received before sending a transmission to the host 130. The character stream code segment then may send updates to the host every Y subsequent characters. Alternatively, the character stream code segment may include a delay feature set that transmits an update to the character stream if there are Z seconds of user inactivity. Thus, when X is 5 ("five") characters, Y is 2 ("two") characters, and Z is 1 ("one") second, the character stream code segment for a user who types in "DULLES GAS STAT." would request results 1) after "DULLE" 2) after "DULLES", "DULLES GA", "DULLES GAS", "DULLES GAS ST", and "DULLES GAS STAT". In the same example, if the user typed "DULLES GAS S" and paused for more than a second (when Z=1 second and the delay feature set is being used), the character stream code segment would send the "DULLES GAS S" string to the host for analysis.

The client 110 may include a preliminary analysis code segment to analyze the character stream and send periodic updates. The preliminary analysis code segment screens the character stream to enhance the efficacy of the results generated for the character stream. In one example, the preliminary analysis code segment identifies one or more databases or segments likely to be associated with the predicted interest of a consumer. Thus, when "20005" is entered, the preliminary analysis code segment may instruct an instruction in the transmission to the host 130 to poll geographic information related to zip code 20005. Other examples may include the preliminary analysis code segment identifying a service industry (e.g., plumbers), a segment (e.g., online music), or a combination of factors (e.g., plumbers in zip code 20005) as relevant to the results that are sought by the user. With the preliminary factors identified, the transmission may be sent to an appropriate database, or a query may be modified as a result of performing the preliminary analysis.

In another example, the preliminary analysis code segment also may correlate information that has been learned about a user with the character stream. If the client is believed to be operating in a particular area (e.g., based on billing information for the user), the character stream can be modified to instruct the host 130 that results should be responsive to the user's address of record. Similarly, the preliminary analysis code segment may interface with a cache or user history to better identify results for the user. Thus, if a history of user activity indicates that the user is interested in National Football League sporting events, the preliminary analysis code segment may tailor results based on the relationship of the results to American Football rather than International Football (soccer). The preliminary analysis code segment also may retrieve and display locally stored results before the host 130 is accessed.

The client 110 may include a communications code segment that interfaces with the information retrieval code segment (e.g., browser or key word tool) to modify the character stream results to reflect the network environment of the client. For example, when the client 110 includes a wireless phone with limited bandwidth, the communications code segment may structure the communications exchange to limit the amount of data in results that are returned so as not to overwhelm the network 120. This may include filtering the results so that no more than a specified number of results are returned. Similarly, the format of the results may be modified to reduce the bandwidth of results. For example, results transmitted to the client 110 may have the graphics or images removed from the application.

The client may include a display code segment that tailors the results to a display device (e.g., a monitor or a LCD ("Liquid Crystal Display")). The display code segment may manage the presentation of results so that only the most likely results are presented. The display code segment may interface with the host 130 so that the number of results does not overwhelm the memory or display capabilities of the client. In one example, the display code segment may instruct the host 130 to transmit no more than a specified number of results. In another example, the display code segment may instruct the host 130 to not return any result items larger than a specified size.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 may include hardware and/or software capable of enabling direct or indirect communications between the client 110 and the host 130. As such, the network 120 may include a direct link between the client 110 and the host 130, or it may include one or more networks or subnetworks between them (not shown). Each network or subnetwork may include, for example, a wired or wireless data pathway capable of carrying and receiving data. Examples of networks include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 130 is generally capable of executing instructions under the command of a host controller (not shown). The host 130 may include one or more hardware components and/or software components. An example of a host 130 is a general-purpose computer (e.g., a server or a mainframe computer) capable of responding to and executing instructions in a defined manner. Other examples include a special-purpose computer, a workstation, a PC, a device, a component, other physical or virtual equipment, or some combination thereof capable of responding to and executing instructions.

The controller is a software application loaded on the host 130 for commanding and directing communications exchanged with the client 110. Other examples include a program, a piece of code, an instruction, a device, a computer, a computer system, or a combination thereof, for independently or collectively instructing the client 110 or the host 130 to interact and operate as described. The host 130 may be embodied permanently or temporarily in any type of machine, component, physical or virtual equipment, storage medium, or propagated signal capable of providing instructions to the client 110 or the host 130.

The controller may include one or more information providing applications to support information retrieval requests sent from the client 110. The information providing applications may include a results code segment that receives a character stream from the client 110 and generates results responsive to a predicted interest by an individual user. Thus, the results code segment may generate one or more results based on the exchange of a character stream received from a client 110.

The results code segment also may receive character stream modifiers received from the preliminary analysis code segment, the communications code segment, the display code segment, and/or other code segments that modify a character stream transmission from the client. The results code segment may process the character stream in accordance with these modifiers. The host 130 also may operate code segments that perform operations similar to the feature sets in the preliminary analysis code segment, the communications code segment, and the display code segment. These host-oriented versions of these code segments may interface with the results code segment to modify the analysis performed and/or the results that are returned. For example, the host 130 may initially access a cache of content previously requested by the user. The previously-returned results may be analyzed for relevancy before additional analysis is performed or additional systems are polled.

The host 130 may interface with a database 140 to analyze the character stream. Generally, the database 140 includes storage for a volume of data and a processing engine that enables the data to be sorted, searched, and analyzed. The database may be organized along functional criteria. For example, a mapping database may be organized by geographical region, while a yellow pages database may be organized by business as well as geographic criteria. In one example, the database may be structured to perform a more detailed analysis on a character stream provided by a host 130. For example, a host 130 may receive a character stream from a client and redirect queries to one or more databases 140. Each of the redirected queries may be modified to further refine the redirected query. For example, a query redirected to a yellow pages directory may have the zip code added as a selection term. Similarly, a query directed to a database that provides stock quotes may include a reference describing which stocks are of interest to the user (e.g., stocks owned by the user).

Figure 2:
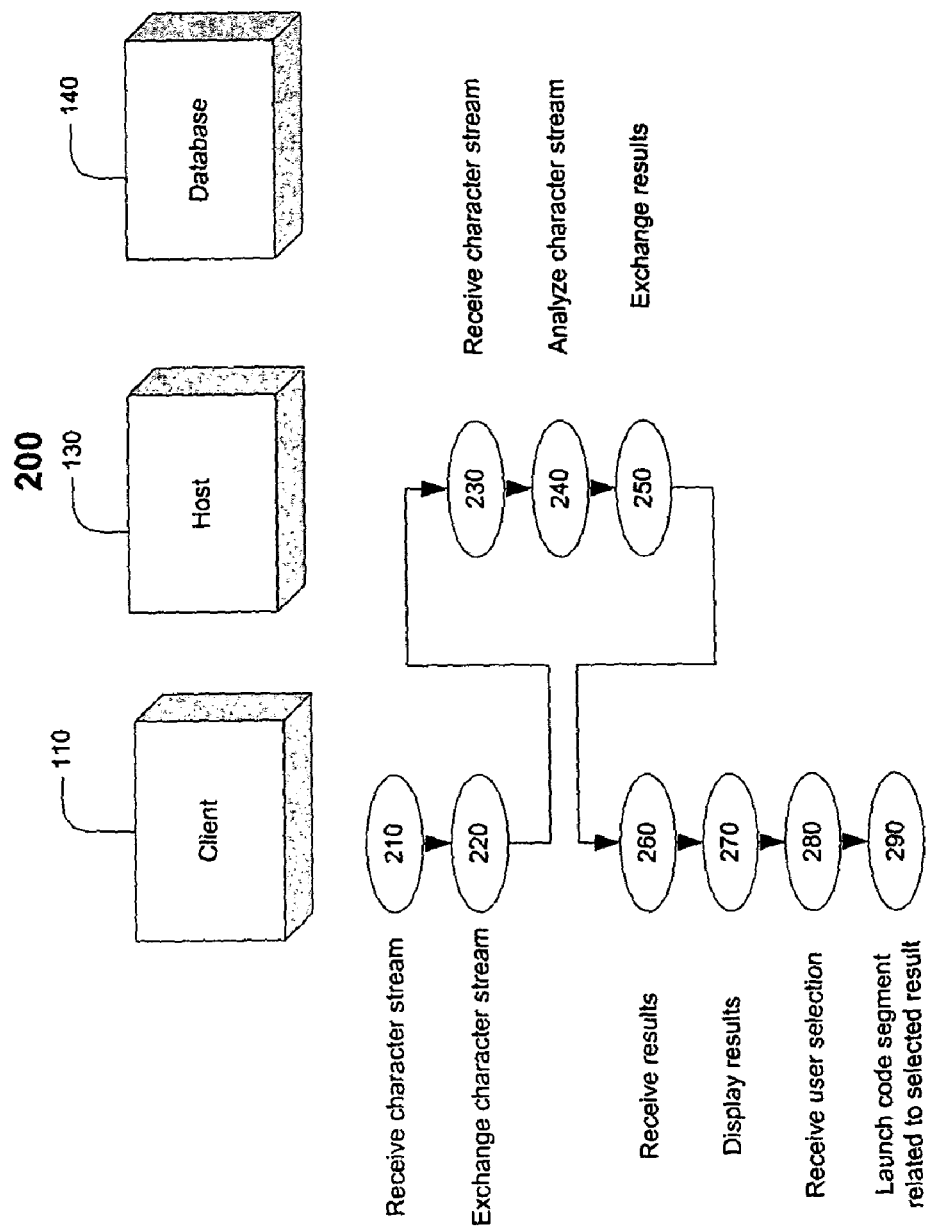
FIG. 2 is a flow chart showing how a client may use a host to intelligently present results related to a character stream.

Referring to FIG. 2, a flow chart 200 illustrates how a client 110 may use a host to intelligently present results related to a character stream of noncompletion characters. Generally, the systems in flow chart 200 relate to the systems described in FIG. 1. Flow chart 200 illustrates how the client 110 receives a character stream (step 210) and exchanges the character stream with the host (step 220). The host 130 receives the character stream (step 230), analyzes the character stream (step 240), and exchanges the results with the client 110 (step 250). The client 110 receives the results (step 260), displays the results (step 270), receives a user selection (step 280), and launches a code segment related to the selected result (step 290).

Initially, the client 110 receives a character stream of one or more noncompletion characters (step 210). Generally, receiving a character stream of one or more noncompletion characters includes receiving and organizing a user's keystrokes that are entered into a user application. For example, a user may be typing an entry into an address form for a web browser, or a key word entry field in a key word utility. Receiving the character stream may include structuring the character stream into transmissions to be exchanged with a host 130. For example, the client application may organize the transmission into a first message after a predetermined number of characters has been entered. The client application may structure additional messages to be created after a predetermined number of additional characters has been entered or a predetermined time period has elapsed between the user-entered characters. The noncompletion label indicates that the user has not indicated that the character entry process has been completed. In other words, a character stream with noncompletion characters indicates that additional characters may be received to modify the search results that are displayed in response to the predicted interest of the user. In contrast, the carriage return or "Enter" key is typically used as a completion character that enables the user to expressly generate results based on the completed character stream. Additionally, the carriage return is a completion character in that additional characters do not cause the results to be modified.

Regardless of how the transmissions between the client 110 and the host 130 are structured, the client 110 sends the character stream with the host (step 220), which receives the character stream (step 230). The host 130 then analyzes the character stream (step 240). Typically, analyzing the character stream includes relating the received character stream to one or more results that are responsive to a predicted interest by the user. In one example, the character stream may be compared with metadata labels used to describe content accessible to the host 130. For example, when the character stream includes "Nashvill", the host 130 may anticipate that "Nashvill" will eventually be completed to "Nashville, TN" and identify web pages that feature Nashville, Tenn. in the web page and/or are summarized by Metadata labels with "Nashville, TN". However, the host 130 need not find identical character matches. For example, the host 130 may predict that a user entering "Nashvill" is predictive of an interest in country music. Accordingly, when the host 130 analyzes the results, the host 130 may also identify results related to country music, even if the results are not related to Nashville, Tenn. In another example that illustrates how the character stream may be analyzed using supplemental information, the results may be translated to include country music only when the host determines that the user is not from Tennessee.

Analyzing the character stream may include ranking the relative relevancy of results. For example, widely visited Nashville web sites (e.g., the Nashville Board of Tourism) may be scored as more relevant to a non-Nashville resident than a web site that includes a Nashville resident's personal web log ("blog"). The results may be generated in such a manner that the more relevant results are returned before the less relevant results.

With the character stream analyzed and the results identified, the host 130 exchanges results with the client 110. The results may be controlled so as to comply with the network or display constraints of the client. For example, if the network has limited bandwidth or the client has limited display capabilities, the host 130 may structure the transmission to avoid network congestion or may modify the results so as provide more suitable results (e.g., by removing images from the results that are returned).

The client 110 receives the results (step 260). The client 110 may perform additional processing to review the results to increase the efficacy of the display. For example, the client 110 may relate the returned results to a user profile and tailor the results to be displayed accordingly. In another example, the client may analyze the results to better develop the user profile and interests to increase the efficacy of subsequent character stream operations. Regardless of whether the results undergo intermediary processing, the client 110 displays the results (step 270). The results are presented in a manner that enables the user to select one of the results instead of completing their intended sequence of characters. For example, as a user types in an entry in a key word retrieval application, a drop down window may appear in the key word retrieval application with one or more likely results. As the user continues typing, the results appearing in the drop down window may be tailored to reflect the latest analysis of the character stream. When the user sees a result of interest, the user may select the result (step 280). Selection of a result causes the application to launch a code segment related to the selected result (step 290). For example, when the user selects a result describing a map of an area, a web browser accessing a mapping web site may be launched to display a map related to the inputted character stream.

Figure 3:
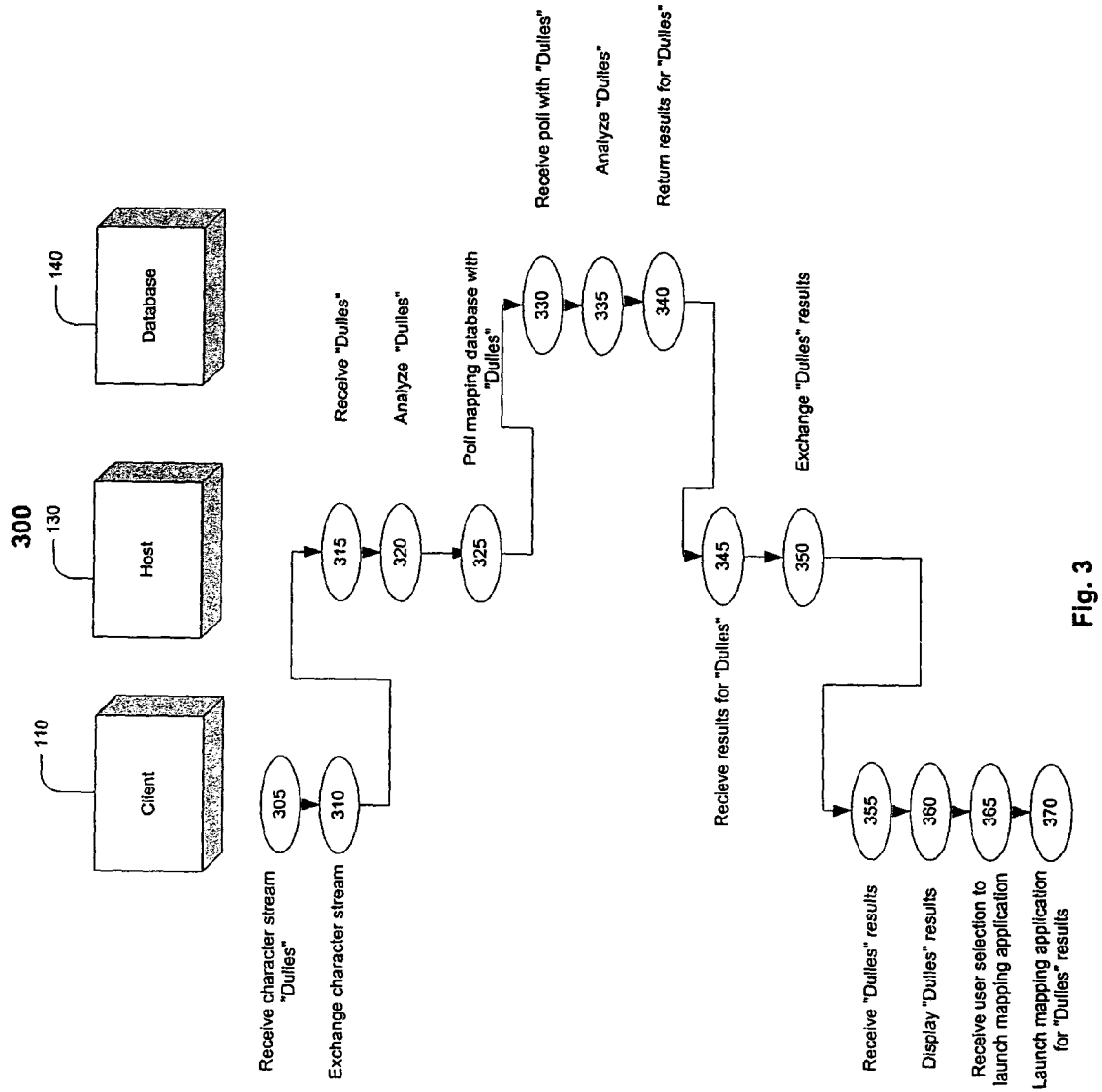
FIG. 3 is a flow chart showing how a client exchanges a character stream with a host and receives mapping information related to the character stream.

FIG. 3 shows a flow chart 300 illustrating how a client 110 exchanges a character stream with a host 130 to retrieve mapping information residing on a database 140. Generally, the systems and operations described in FIG. 3 relate to the systems and operations described previously with respect to FIGS. 1 and 2. However, FIG. 3 illustrates how the host 130 may interface with the database 140 to retrieve results for the client 110. The client 110 exchanges the character stream with the host 130. The host, in turn, uses the database 140 in its analysis of the character stream to produce results. The host provides the results to the client 110, which, in turn, presents the results and launches the appropriate code segment when the user selects the result of interest.

Initially, the user of client 110 enters the character stream "Dulles" (step 305). The client exchanges the character stream with the host 130 (step 310), which receives the character stream "Dulles" (step 315). The host 130 analyzes the character stream "Dulles" (step 320). The host 130 may perform a local analysis of a character stream to compare the character stream against popular results that are cached on the host 130, while distributing customized queries to specialized databases to identify results of greater relevance. For example, in flow chart 300, analyzing the character stream includes polling a mapping database related to "Dulles" (step 325). Although flow chart 300 depicts one database 140 being accessed, multiple databases may be polled. Examples of other databases that may be polled include, but are not limited to, messaging databases, directory services, yellow pages, and financial databases.

The database 140 receives the poll with "Dulles" (step 330). "Dulles" is then analyzed (step 335), and results are retrieved. For example, multiple maps related to Dulles, Va., could be identified and/or retrieved. This may include a map of Dulles Township, directions to Dulles International Airport, and directions to various corporate offices located in Dulles, Va. The results are then returned to the host 130 (step 340).

Upon receiving the results (step 345), the host 130 exchanges the "Dulles" results with the client (step 350). Exchanging the results with the client may include synchronizing results received from multiple databases and identifying the results of the greatest relevance. For example, multiple databases may be polled to analyze the character stream. The overall number of results returned from the client 110 may be too large for the client 110 to process and/or display. Accordingly, the host 130 may filter and identify only those results relevant to the host. In one example, the most relevant results are returned to the client 110, while the pool of results remains available for analysis in light of subsequently received characters in the character stream. In another example, the results from the databases are received at different times. For example, a query that precisely develops and then matches a user demographic may take longer than a query that compares the results against the most commonly retrieved results. Exchanging the results may include initially presenting the most commonly retrieved results and then subsequently presenting the results of the longer query when the results of the longer query become available.

The client receives the "Dulles" results (step 355) and displays them (step 360). As shown, when the client 110 receives a user selection to launch a mapping application related to "Dulles" (step 365), the client 110 launches a mapping application for the selected "Dulles" results (step 370).

Figure 4:
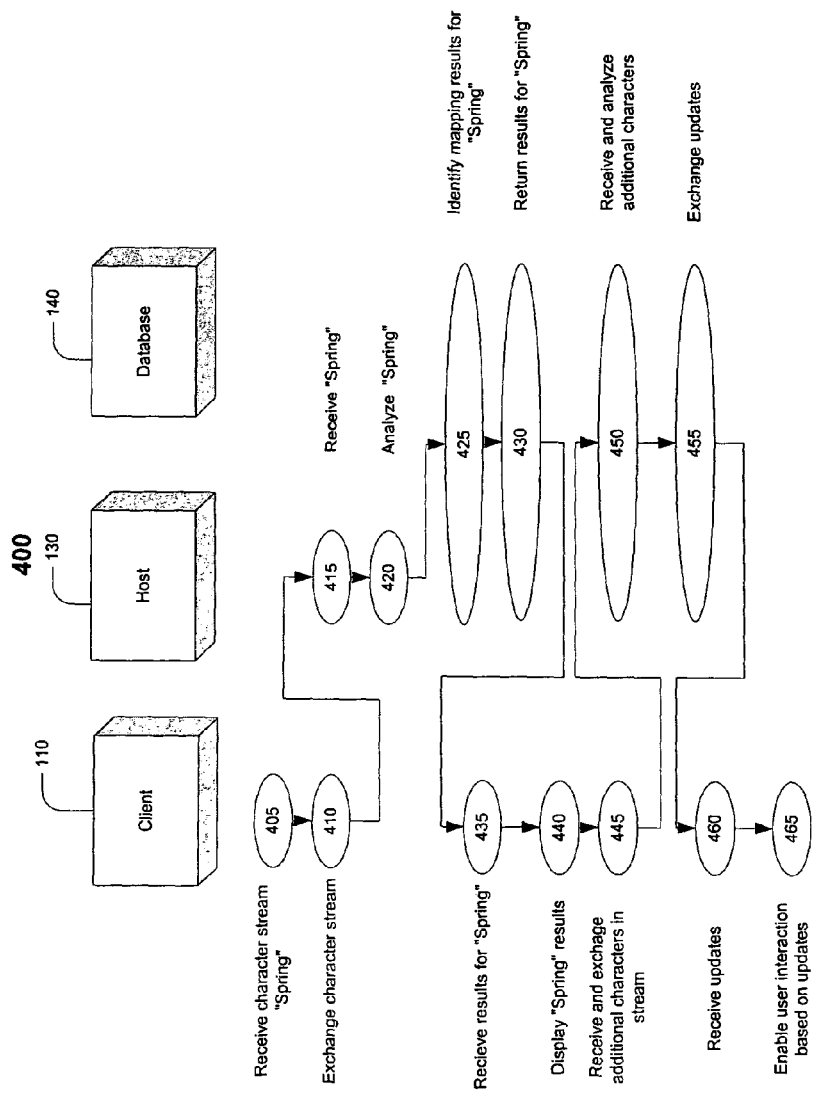
FIG. 4 is a flow chart showing how the client display may be modified based on updates to the character stream.

FIG. 4 illustrates a flow chart 400 showing how the client display may be modified based on updates to the character stream. Generally, the systems and operations shown in FIG. 4 relate to the systems and operations described previously with respect to FIGS. 1-3. However, flow chart 400 illustrates how updates to the character stream may generate different results with which the user may interact. In particular, subsequently received characters in the character stream may generate a different set of results for display by the client. In this manner, the user may modify the character stream and observe in real-time new results based on the modifications.

Initially, the client receives the character stream "Spring" (step 405), and exchanges the character stream 410 with the host 130 (step 410). The host 130 receives the character stream "Spring" (step 415) and analyzes the character stream "Spring" (step 420). The host 130 and/or the database 140 identifies mapping results for the character stream "Spring" (step 425), and returns these results to the client 110 (step 430). The client receives the results related to "Spring" (step 435) and displays them (step 440).

The client then receives and exchanges additional characters in the character stream (step 445). For example, although the string "Spring" may likely identify information related to the several cities of Springfield, the user may enter additional information to confirm that Springfield is what the user has in mind and to identify the Springfield of interest to the user. Thus, the user may enter a field "I" as the next characters to express interest in Springfield, Ill. The host 130 and/or the database 140 receives and analyzes the additional characters (step 450). The host 130 and/or the database 140 generates a new set of results related to the update, which is exchanged with the client 110 (step 455). In the example using Springfield, Ill., mapping and yellow page information related to the town of Springfield, Ill. may be exchanged.

The client 110 receives the updates (step 460) and enables the user interaction based on the updates (step 465). For example, a list of maps, services, and other information related to Springfield, Ill. may be displayed.

Figure 5:
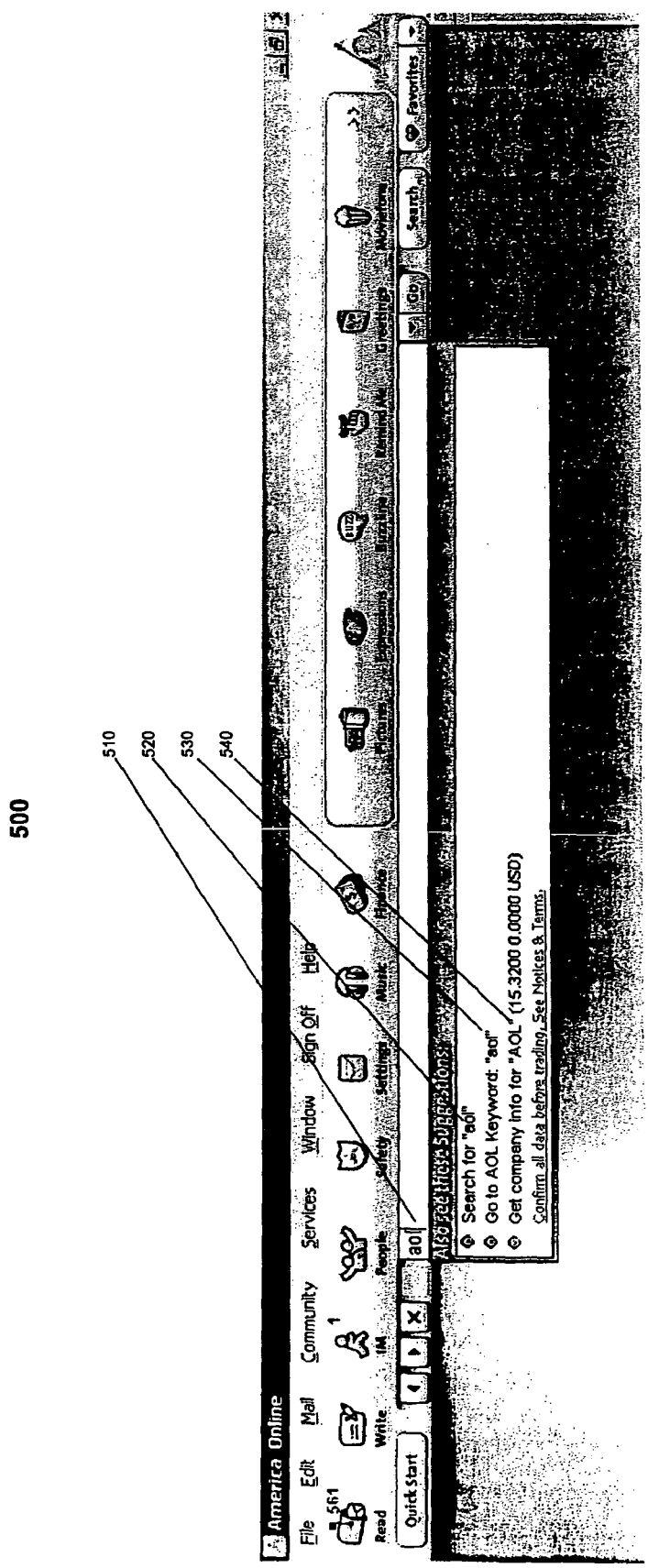
FIGS. 5-10 are exemplary graphical user interfaces (GUIs) illustrating how real-time results related to a character stream may be presented.

Referring to FIG. 5, exemplary results related to a character stream with noncompletion characters are shown in GUI 500. Generally, GUI 500 may be displayed on a client 110 that was primarily described with respect to FIG. 1 using the operations described with respect to FIGS. 2-4. GUI 500 illustrates code segments that may be invoked in a results page as a character stream is entered in a user application such as a web browser. Specifically, text entry field 510 has received the character stream "aol" without a carriage return as is indicated by the cursor "|". GUI 500 includes a result 520 that enables a search to be launched for the string "aol", a result 530 that enables a code segment to be launched for the AOL Keyword "aol", and a result 540 that enables a code segment that retrieves a stock quote for "AOL", which is shown trading at 15.32 US Dollars on a stock market exchange.

Figure 6:
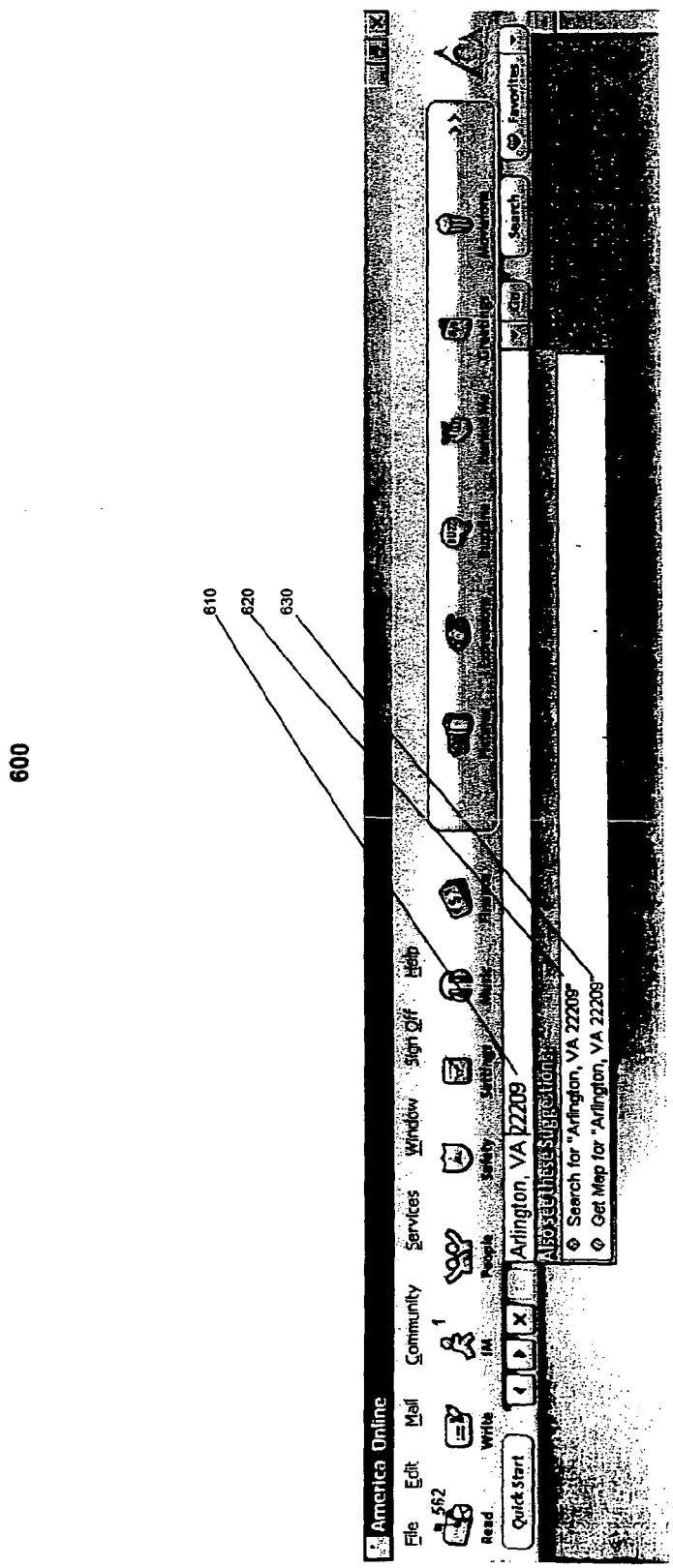

Referring to FIG. 6, exemplary results for the character stream "Arlington, VA 22209" are shown in GUI 600. Generally, GUI 600 relates to systems, operations, and displays described previously with respect to FIGS. 1-5. However, GUI 600 illustrates the different databases and/or applications that may be accessed from a user application. For example, when "Arlington, VA 22209" is inserted in text entry field 610, a searching code segment can be launched using result 620 and a mapping code segment can be launched using a result 630.

In one example, the displays related to results 620 and 630 have already been retrieved by the client 110. Alternatively, content in the displays related to results 620 and 630 may need to be downloaded (e.g., from the host 130 and/or the databases 140).

Figure 7:
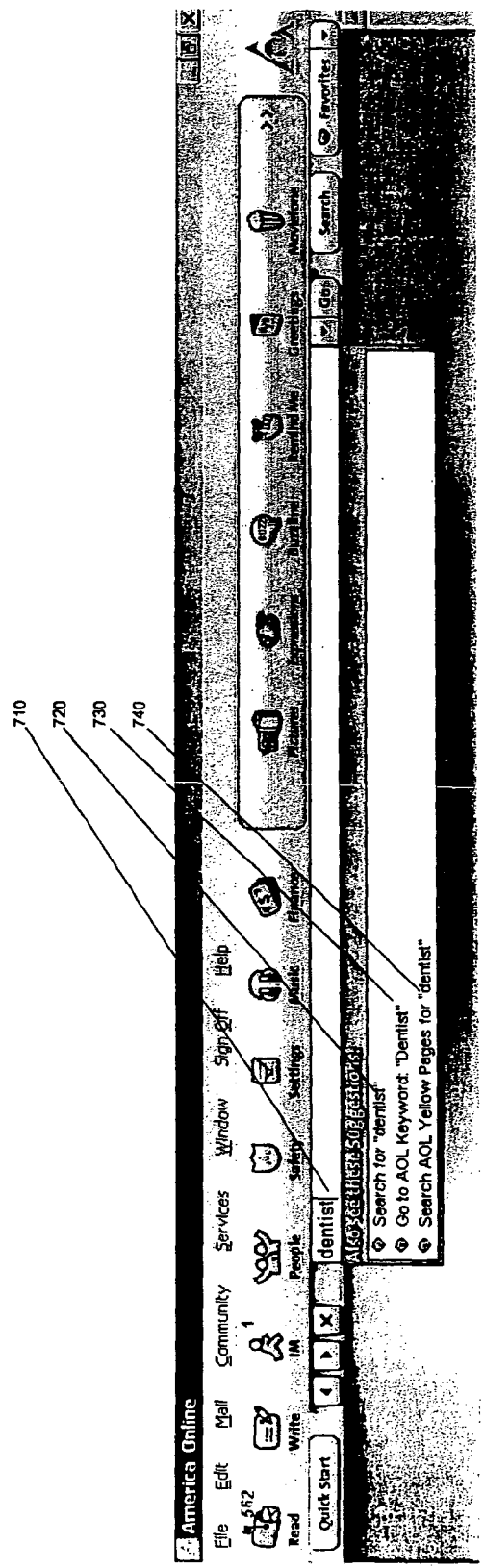

FIG. 7 illustrates a GUI 700 that is related to the character stream "dentist". Generally, GUI 700 relates to the systems, operations, and displays described previously with respect to FIGS. 1-6. However, GUI 700 illustrates how the character stream can be analyzed to identify a yellow page entry related to the character stream.

GUI 700 includes result 710 enabling the user to launch a code segment to search on the character stream "dentist". Note that, although in GUI 700 the character stream includes the complete text for dentist, shorter strings, such as "dentis" or "denti" also may be analyzed and used to generate a result that launches a search on the character strings "denti" or "dentist". Result 720 enables the user to launch a code segment so that the client can "Go to" the AOL keyword "Dentist".

Result 730 enables the user to launch a code segment to search the AOL Yellow Pages for "Dentist". Note that, although result 730 features a result to launch a search of the yellow pages for "dentist", other GUIs may include a list of available dentists. For example, if the user's location is known, a list of dentists in the user's zip code may be presented, with the dentists sorted and presented by specialties. A result from the GUI may be selected to launch the dentist's web page, launch a messaging application to exchange communications with the dentist, or launch a calendaring application to create a dentist appointment.

Figure 8:
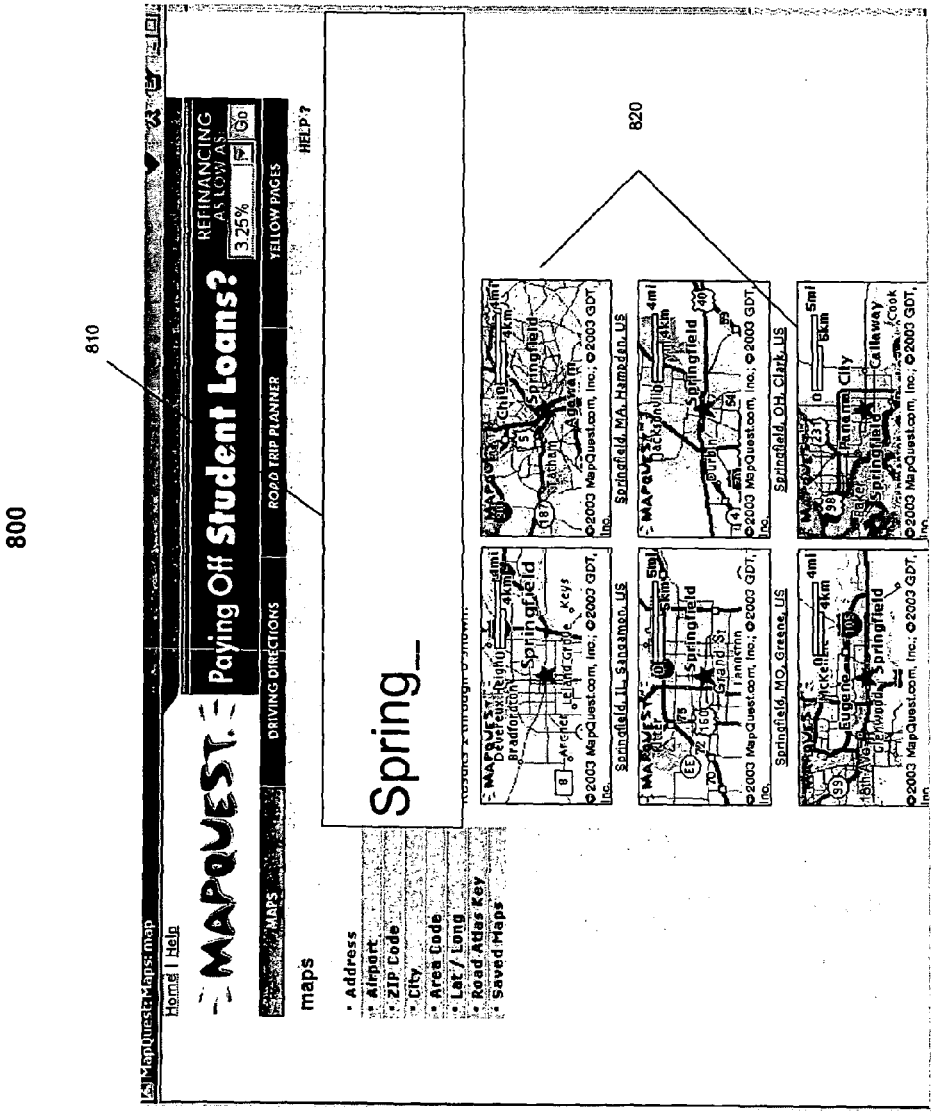
Figure 9:
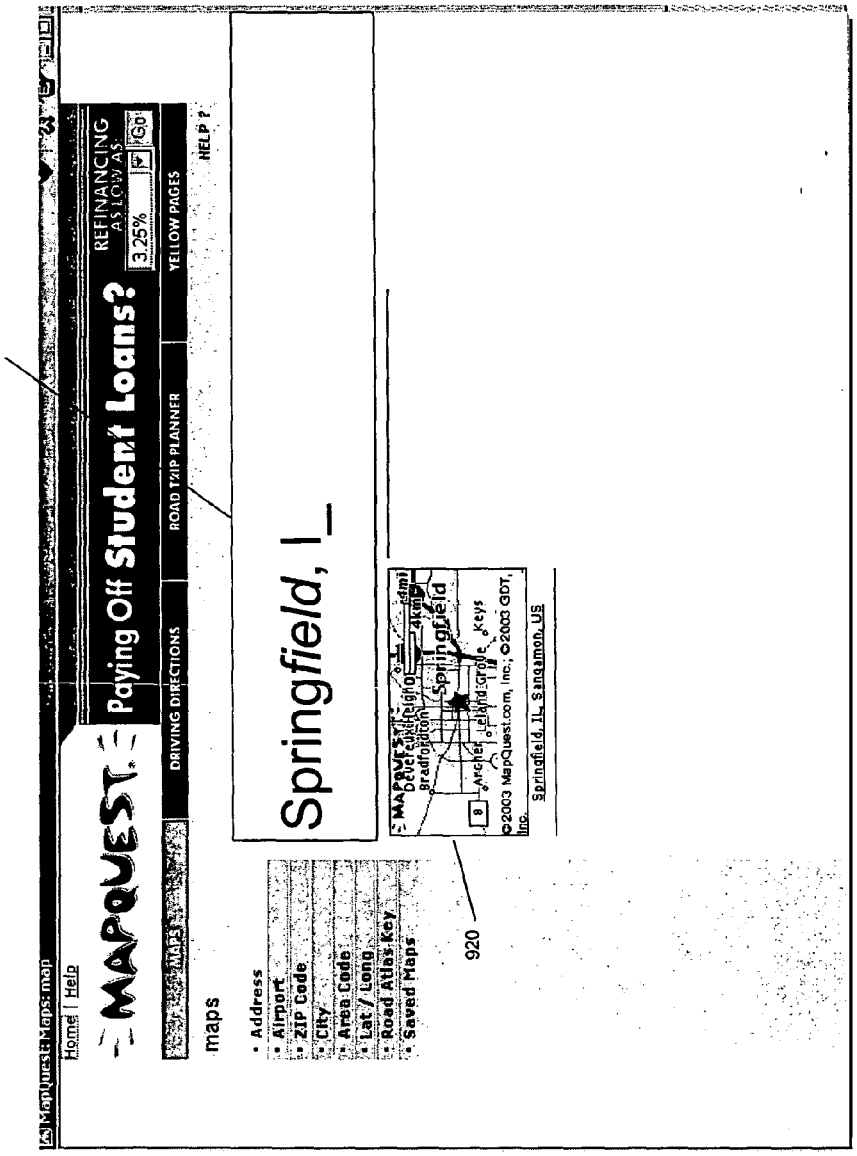

Referring to FIGS. 8 and 9, GUIs 800 and 900 illustrate how the displayed results may be altered as additional characters in the character stream are received. Generally, GUIs 800 and 900 relate to the systems, operations, and displays described previously with respect to FIGS. 1-7. However, GUIs 800 and 900 differ from the previous displays in that the results are not displayed in a drop down window as appeared in FIGS. 5-7. Also, GUIs 800 and 800 illustrate how results may be generated and displayed using a portion of the intended character stream and also how updates to the character stream need not follow the preceding character stream to precisely form the string of interest. GUI 800 shows the multiple results 820 that are available after "Spring" has been inputted into the text entry field 810. GUI 900 indicates that after an "I" is subsequently entered in text entry field 910, the results may be filtered so that only the results 920 "Springfield, Illinois" are displayed. Note that none of the intervening characters (e.g., the "field," in Springfield, Illinois) were included in the character stream.

Although GUIs 800 and 900 indicate that a mapping resource is being accessed, the operations described for FIGS. 8 and 9 are applicable in other applications and environments. Because the user entered the character stream within a mapping application, the results may be tailored to seek map results. This may be performed by searching a mapping database, or by polling a host 130 with a modifier indicating that mapping results should be retrieved. Although GUIs 800 and 900 do not require or allow the user to specify a mapping requirement or restriction, other GUIs may allow the user to specify the databases that are used to analyze the character stream (not shown).

Figure 10:
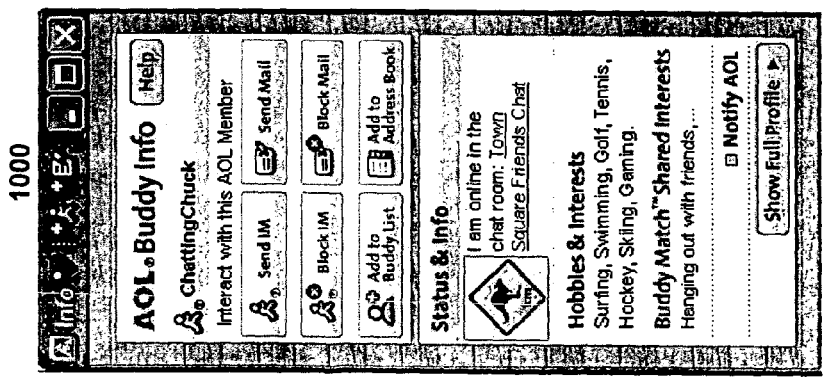

Referring to FIG. 10, GUI 1000 is an exemplary messaging display that enables a user to exchange messaging communications. Generally, GUI 1000 relates to the systems and profiles described previously with respect to FIGS. 1-9. However, GUI 1000 illustrates the messaging results that can be displayed when the character stream relates to messaging information. For example, when a user types in "chattingchuck" in a text entry field (not shown), GUI 1000 may be displayed, enabling the user to send mail, send an instant message, add "chattingchuck" to an address book, block mail and instant messages from "chattingchuck", and/or view the status or interests for "chattingchuck". Although FIG. 10 illustrates the messaging applications or operations related to one user named "chattingchuck", results related to more than one user may be displayed. Similarly, when the user enters an "@" character (the AT character associated with Internet Mail systems), options not related to electronic mail messaging may be removed.

Other implementations are in the scope of the following claims. For example, although the operations described examples of retrieving results that relate to a character stream, the results need not include the information that will ultimately be displayed upon launching a code segment. Rather, the results may include a label that describes the results that may be subsequently retrieved if accepted.

Similarly, the client and host applications may include assistants and spelling correction agents to increase the efficacy of retrieved results. Assistants may help the user by retrieving similar results related to the predicted character stream's meaning. For example, if the character stream includes "German automobiles," results that include prominent manufacturers of German automobiles, including Mercedes, BMW, and Audi, may be retrieved. Spelling correction agents may recognize that the user has likely entered a typographical mistake. In response, the spelling correction agents may correct the character stream by altering the entered character stream on the desktop and/or by retrieving results related to the predicted entry.

Similar to the spelling correction agent, the system may include a validation agent that may be used to validate a URL ("Uniform Resource Locator") entered in the character stream. For example, when the user enters the address for a web site, the web site address may be analyzed to determine if the device and file information actually exists and/or is correct. When the URL information is incorrect, the system may resolve the character stream to identify the correct or related URL address.

The client 110 may be used to intelligently present results related to media communications such as streaming audio and video communications. For example, a content provider or a service provider may be distributing a large number of "channels" or bands of discrete presentations. A user may wish to survey the channels to find channels presenting information most relevant to the user's interests. Accordingly, the user may enter a character stream relating to content the user finds of interest. For audio content, the character stream may relate to an artist, album, or selection (e.g., song) name. For video content, the character stream may relate to a particular news affiliation (e.g., TIME or CNN), show, episode, or subject mater. In any event, regardless of the underlying content, the character stream may be used to retrieve results related to the user's interests as expressed in the character stream. This may be performed by comparing the entered character stream with metadata or subtitles associated with a particular media selection. In one instance, the character stream may be compared with the subtitles for available programming to identify results for the user. Thus, when the user enters the name in a character stream of a newsmaker, the subtitles of all available programming (including on-demand and broadcast streams) may be searched to identify media streams featuring the newsmaker.

The resultant media streams may be presented in a variety of formats. In one example, a drop down menu appears to enable the user to launch a media application related to the retrieved results. In another example, when the media streams include video streams, a tile of video streams similar to the tiled orientation in FIG. 8 may be displayed. The video stream tiles may include reduced bit rate presentations to provide the user with a brief indication of the video content available. When a user selects one of the video tiles, an instance of the video selection at a greater bit rate may be presented.

The systems and operations may be modified to operate in an Intranet or trusted environment. For example, rather than searching public databases, the system may be configured to incorporate security procedures and practices associated with a trusted environment. Thus, a sales employee may be allowed to access customer and marketing databases in analyzing the character stream. Engineering personnel may be allowed to review technical and operational support databases to support their mission, but may be precluded from analyzing the character stream using a sales database. Management and/or investigatory personnel may be allowed to access most or all databases in analyzing a character stream.

The results may be stored on the client 110 and/or the host 130. For example, the host 130 may cache previously returned results that may be used when analyzing subsequent character streams. In another example, previously selected results may be stored on the client and subsequent character streams may initially be accessed using the previously-stored results.

The client 110 may enable the user application to launch a messaging code segment. Alternatively, the user may be entering the character stream in a messaging application. For example, the user may be entering a character stream in an instant messaging application. The instant messaging application may transmit the character stream to a host 130 for analysis. The client 110 may receive the results and enable the client to transmit an instant message when the results indicate that an identified user is online.

Exchanging the updates may include exchanging only the portion of the character stream that has changed since the character stream was last exchanged. For example, as a user initially types in information into a first application, the first application may send a message to the host 130 with the initially entered character stream (e.g., "Spring"). As the user enters updates to the character stream (e.g., by typing "field" after "Spring"), the client 110 may send the new information without sending the old information (e.g., the client 110 subsequently sends "field" instead of "Springfield"). Alternatively, the client 110 may send the current character stream. For example, the client 110 may first send "Spring" and then later transmit "Springfield".

The client 110 and/or host 130 may determine that there are no relevant results and operate to preclude additional processing resources from being used. For example, the user may be entering character streams for which the host 130 has no information and generates no results. When the host 130 determines that there is no information, the host 130 may interface with the client 110 to prevent additional updates from being exchanged. Such a condition occurs when the user enters a character stream that does not relate to content accessible by the host 130. For example, the host 130 may determine that CHARACTERSTREAM1 will not yield any results, and no extension of CHARACTERSTREAM1 will yield any results. If the user enters additional information, such as CHARACTERSTREAM123, the first application will not send any updated information to the host 130. However, if the user uses the DELETE key to modify the character stream so that CHARACTERSTREAM1 is changed to CHARACTERSTREAM, the character stream may be exchanged.

The client 110 may perform preliminary analysis to preclude common character streams from being analyzed where the common character stream generates results that are not responsive to the predicted interest of a user. For example, when "the" appears in a character stream, particularly in an initial portion of the character stream, generating results using the character stream "the" likely generates too many results, few, if any, of which are responsive to the predicted interest of the user. Accordingly, exchanging the character stream may be delayed until the character stream is meaningful. Thus, exchanging the character stream "the" may be delayed until character stream reads "the Greek islands" or another character stream likely to generate meaningful results. Similarly, the character stream may be restructured to remove strings in the character stream not likely to assist in the analysis (either on the client 110 or the host 130). Thus, strings appearing in the character stream such as "the", "a", and "this" may be removed from the character stream prior to exchanging the character stream.

Displaying the results may include displaying the results directly in addition to displaying a label for the results that enables a code segment for the results to be launched. For example, the results may include an actual stock quote rather than a label for a code segment that generates a stock quote. The displayed result may include a capsule or brief summary for a news item. The capsule also may be configured to retrieve a more detailed article on the news item when the user selects the news item.

Other examples of results that may be retrieved may include, but are not limited to, phone numbers and/or keywords. Clicking on a result with a phone number may allow an Internet phone call to be placed. The phone call may be bridged to a telephone network or connected to an IP phone (e.g., a virtual phone application residing in a dialed user's PC).

The results and additional information descriptive of results previously returned or selected may be stored on the client 110 and/or the host 130. For example, the most recently accessed results may be cached on the client 110, while a more extensive history of results may be cached on the host 130. The stored results may be accessed and used to analyze and generate results responsive to a user's predictive interest.

To illustrate how stored results may be used to analyze a subsequent character stream, a previous search related to the National Football League (NFL) may generate a series of metadata tags. These metadata tags may be stored in a profile associated with the user. For example, the user searching for NFL-related information may have the metadata tags "NFL", and "Football" added to their user profile. The metadata tags may be used in performing subsequent analysis. Thus, when the user types in "Falcons", additional metadata tags related to the multiple meanings of "Falcons" may be generated and analyzed using the metadata tags previously generated. Examples of metadata tags related to Falcons may include terms such as "NFL", "Audubon Society", and "Sport of Kings". The metadata tags from the previous search on the NFL may be compared against metadata tags generated by entering "Falcons". By correlating the results from a previous search with known metadata tags for the term of interest, results that are likely to be more responsive to the predicted interest of a user are returned. In this case, correlating the results of the previous search with the present search generates results related to the NFL's Atlanta Falcons.

The results from multiple users may be used to determine results that are more responsive to a predictive interest of a different user. For example, if most of the users entering "Falcons" as a character stream are determined to be interested in the NFL, a default rule may be created and adopted that returns results related to the NFL sports team in response to "Falcons." A finer analysis may be performed by suspending the default rule when the user has a profile or has expressed an interest in other, non-sports aspects of "falcons" or used modifiers such as "birds", "Audubon Society", or "kestrels".

Other implementations are within the scope of the following claims.

What is claimed is:

1. A method of presenting information to a user, the method comprising:
   receiving, from a user, a character stream of one or more non-completion characters that indicate that additional characters may be received;
   providing the character stream to a host that analyzes the character stream to generate results that are responsive to the user's predicted interest;
   receiving, from the host, a first result that includes a first argument and an identifier of a first web application, wherein the first web application is configured to provide first specialized services and the first argument is passed to the first specialized services in response to user selection of the first result;
   receiving, from the host, a second result that includes a second argument that is different from the first argument, and an identifier of a second web application, wherein the second web application differs from the first web application in function, wherein the second web application is configured to provide second specialized services and the second argument is passed to the second specialized services in response to user selection of the second result;
   displaying the first result in a manner enabling the user to perceive, before selecting the first result, the first argument and the identifier of the first web application;
   displaying the second result in a manner enabling the user to perceive, before selecting the second result, the second argument and the identifier of the second web application; and
   enabling the user to select from among the first and second results,
   wherein receiving the character stream of one or more non-completion characters comprises receiving a character stream of one or more non-completion characters that have been entered, by the user, to an address line of a web browser,
   receiving the first result that includes the first argument and the identifier of the first web application comprises receiving a mapping result that includes a first location and an identifier of a web mapping application, the mapping result including cartographic information, and
   displaying the first result in a manner enabling the user to perceive, before selecting the first result, the first argument and the identifier of the first web application comprises displaying the mapping result with an indication of an overview map that the user may select to display more detailed mapping information related to the overview map selected.

2. The method of claim 1 further comprising:
   receiving, from the user, one or more updates to the character stream;
   providing the updates to the host to permit the host to analyze the character stream using the updates to generate updated results that are responsive to the user's predicted interest;
   receiving the updated results; and
   displaying the updated results so that the user may select one of the updated results.

3. The method of claim 2 wherein providing the updates to the character stream includes providing all characters in the character stream.

4. The method of claim 2 wherein providing the updates to the character stream includes providing one or more characters in the character stream that have been received from the user since the character stream was last provided.

5. The method of claim 1 wherein providing the character stream includes determining whether there is a sufficient amount of data in the character stream to generate accurate results, and, if there is a sufficient amount of data in the character stream to generate accurate results, analyzing the character stream to generate results that are responsive to the user's predicted interest.

6. The method of claim 5 further comprising delaying analyzing the character stream if there is not a sufficient amount of data in the character stream to generate accurate results.

7. The method of claim 5 wherein determining whether there is the sufficient amount of data includes waiting until a predetermined number of non-completion characters has been entered.

8. The method of claim 5 wherein determining whether there is the sufficient amount of data includes waiting until a predetermined amount of time has elapsed since the user last entered a new character in the character stream.

9. The method of claim 5 wherein determining whether there is the sufficient amount of data includes waiting until a predetermined number of non-completion characters has been entered, unless a predetermined amount of time has elapsed since a new character in the character stream has been entered.

10. The method of claim 1 further comprising launching the first web application upon selection of the first result.

11. The method of claim 1 further comprising launching the second web application upon selection of the second result.

12. The method of claim 1 wherein providing the character stream to the host includes polling multiple databases to identify results from each of the multiple databases.

13. The method of claim 1 further comprising enabling the user to configure a web browser to control an operating mode of the web browser.

14. The method of claim 13 wherein enabling the user to configure the web browser includes enabling the user to select one or more databases to be accessed.

15. The method of claim 13 wherein enabling the user to configure the web browser includes enabling the user to control a format with which the results are displayed.

16. The method of claim 13 wherein enabling the user to configure the web browser includes enabling the user to control a configuration for a drop down menu used to display the results.

17. The method of claim 1 further comprising:
analyzing the character stream to determine a user profile;
storing the user profile; and
using the user profile to analyze subsequent character streams.

18. The method of claim 1 wherein displaying the first result includes displaying a map related to the character stream.

19. The method of claim 1 wherein receiving the character stream includes analyzing the character stream before providing the character stream to identify that map information is related to the character stream.

20. The method of claim 19 wherein analyzing the character stream includes recognizing that a commonly used address term is present in the character stream.

21. The method of claim 20 wherein recognizing the commonly used address term includes recognizing that a zip code appears in the character stream.

22. The method of claim 20 wherein recognizing the commonly used address term includes recognizing that a state identifier appears in the character stream.

23. The method of claim 20 wherein recognizing the commonly used address term includes recognizing that a city identifier appears in the character stream.

24. The method of claim 1 wherein receiving the character stream includes analyzing the character stream before providing the character stream to identify that vendor information is related to the character stream, and instructing the host to return vendor information in the results.

25. The method of claim 24 wherein identifying that vendor information is related to the character stream includes identifying yellow page information related to the character stream.

26. The method of claim 24 wherein identifying that vendor information is related to the character stream includes identifying a category and a location appearing in the character stream.

27. The method of claim 1 wherein receiving the character stream includes analyzing the character stream for a messaging label appearing in the character stream.

28. The method of claim 27 wherein analyzing the character stream for the messaging label includes enabling the user to communicate with another user.

29. The method of claim 27 wherein analyzing the character stream for the messaging label includes determining that a user identifier appears in the character stream.

30. The method of claim 29 further comprising determining an online status of a user associated with the user identifier.

31. The method of claim 30 further comprising enabling the user to exchange an instant message with the user associated with the user identifier.

32. The method of claim 27 wherein analyzing the character stream for the messaging label includes recognizing that an '@' character appears in the character stream.

33. The method of claim 1 further comprising storing the results.

34. The method of claim 33 wherein storing the results includes storing results selected by the user.

35. The method of claim 33 further comprising:
receiving, from the user, a second character stream of one or more non-completion characters where the non-completion characters indicate that additional characters may be received;
accessing stored results; and
relating the stored results to the second character stream.

36. The method of claim 35 further comprising displaying the stored results when the second character stream indicates that the user is requesting information related to the stored results.

37. The method of claim 36 further comprising, when the stored results do not relate to the second character stream:
providing the second character stream to the host to analyze the second character stream to generate second character stream results that are responsive to the user's predicted interest;
receiving the second character stream results; and
displaying the second character stream results.

38. The method of claim 1 wherein providing the character stream includes validating Uniform Resource Locators (URLs) in the character stream.

39. The method of claim 1 wherein receiving the character stream includes receiving characters entered before a completion character.

40. The method of claim 1 wherein receiving the character stream includes receiving character entered before a carriage return.

41. The method of claim 1, wherein the first web application and the second web application are each a web application selected from a group of web applications comprising a web mapping application, a directory application, a web search application, a keyword application, a stock quote application, a calendar application, a virtual phone application, a messaging application, and a web email application.

42. The method of claim 1, wherein the first web application is a web mapping application and the second web application is a web search application.

43. A system enabling intelligent presenting information to a user, the system comprising:
a processor configured to:
receive, from a user, a character stream of one or more non-completion characters that indicate that additional characters may be received;
provide the character stream to a host that analyzes the character stream to generate results that are responsive to the user's predicted interest;
receive, from the host:
a first result that includes a first argument and an identifier of a first web application, and a second result that includes a second argument that is different from the first argument, and an identifier of a second web application, wherein the second web application differs from the first web application in function;
a display device structured and arranged to display:
the first result in a manner enabling the user to perceive, before selecting the first result, the first argument and the identifier of the first web application, wherein the first web application is configured to provide first specialized services and the first argument is passed to the first specialized services in response to user selection of the first result, and
the second result in a manner enabling the user to perceive, before selecting the second result, the second argument and the identifier of the second web application, wherein the second web application is configured to provide second specialized services and the second argument is passed to the second specialized services in response to user selection of the second result; and
a selection device structured and arranged to enable the user to select from among the first and second results, wherein receiving the character stream of one or more non-completion characters comprises receiving a character stream of one or more non-completion characters that have been entered, by the user, to an address line of a web browser, receiving the first result that includes the first argument and the identifier of the first web application comprises receiving a mapping result that includes a first location and an identifier of a web mapping application, the mapping result including cartographic information, and displaying the first result in a manner enabling the user to perceive, before selecting the first result, the first argument and the identifier of the first web application comprises displaying the mapping result with an indication of an overview map that the user may select to display more detailed mapping information related to the overview map selected.

44. The system of claim 43 wherein the processor is further configured to:

receive one or more updates to the character stream;

provide the updates to the character stream to the host to permit the host to analyze the character stream using the updates to generate updated results that are responsive to the user's predicted interest;

receive the updated results; and enable display the updated results so that the user may select one of the updated results.

45. The system of claim 43 wherein the processor is further configured to determine whether a sufficient amount of data exists in the character stream to generate accurate results, and, if there is a sufficient amount of data in the character stream to generate accurate results, analyze the character stream to generate results that are responsive to the user's predicted interest.

46. The system of claim 45 wherein the processor is further configured to delay analyzing the character stream if there is not a sufficient amount of data in the character stream to generate accurate results.

47. The system of claim 46 wherein the processor is further configured to wait until a predetermined number of non-completion characters has been entered before providing the character stream.

48. The system of claim 46 wherein the processor is further configured to wait until a predetermined amount of time has elapsed since the user last entered a new character in the character stream before providing the character stream.

49. The system of claim 46 wherein the processor is further configured to wait until a predetermined number of non-completion characters has been entered, unless a predetermined amount of time has elapsed since a new character in the character stream has been entered before providing the character stream.

50. The system of claim 43 wherein the processor is further configured to: analyze the character stream to determine a user profile; store the user profile; and use the user profile to analyze subsequent character streams.

51. The system of claim 43 wherein the processor is further configured to:

analyze the character stream before providing the character stream to identify that vendor information is related to the character stream, and instruct the host to return vendor information in the results.

52. The system of claim 51 wherein the processor is further configured to identify a category and a location appearing in the character stream in identifying vendor information.

53. The system of claim 43 wherein the processor is further configured to analyze the character stream for a messaging label appearing in the character stream.

54. The system of claim 43 wherein the processor is further configured to receive the character stream of one or more non-completion characters, the non-completion characters representing characters entered before a completion character.

55. The system of claim 43 wherein the processor is further configured to receive the character stream of one or more non-completion characters, the non-completion characters representing characters entered before a carriage return.

56. A non-transitory computer-readable medium comprising:

means for receiving, from a user, a character stream of one or more non-completion characters that indicate that additional characters may be received;

means for providing the character stream to a host that analyzes the character stream to generate results that are responsive to the user's predicted interest;

means for receiving, from the host, a first result that includes a first argument and an identifier of a first web application;

means for receiving, from the host, a second result that includes a second argument that is different from the first argument, and an identifier of a second web application, wherein the second web application differs from the first web application in function;

means for displaying the first result in a manner enabling the user to perceive, before selecting the first result, the first argument and the identifier of the first web application;

means for displaying the second result in a manner enabling the user to perceive, before selecting the second result, the second argument and the identifier of the second web application; and means for enabling the user to select from among the first and second results, wherein the first web application is configured to provide first specialized services and the first argument is passed to the first specialized services in response to user selection of the first result, and wherein the second web application is configured to provide second specialized services and the second argument is passed to the second specialized services in response to user selection of the second result, wherein receiving the character stream of one or more non-completion characters comprises receiving a character stream of one or more non-completion characters that have been entered, by the user, to an address line of a web browser, receiving the first result that includes the first argument and the identifier of the first web application comprises receiving a mapping result that includes a first location and an identifier of a web mapping application, the mapping result including cartographic information, and displaying the first result in a manner enabling the user to perceive, before selecting the first result, the first argument and the identifier of the first web application comprises displaying the mapping result with an indication of an overview map that the user may select to display more detailed mapping information related to the overview map selected.

57. A method of using a host to process information received from a client to return results related to the information, the method comprising:

receiving a character stream of one or more non-completion characters that indicate that additional characters may be received;

analyzing the character stream to generate results that are responsive to a user's predicted interest, the results including a first result that includes a first argument and an identifier of a first web application and a second result that includes a second argument that is different from the first argument, and an identifier of a second web application, wherein, the second web application differs from the first web application in function;

temporally storing the first and second results;

rendering the first result in a manner enabling the user to perceive, before selecting the first result, the first argument and the identifier of the first web application;

rendering the second result in a manner enabling the user to perceive, before selecting the second result, the second argument and the identifier of the second web application; and transmitting the first and second results to enable the user to select from among the first and second results, wherein the first web application is configured to provide first specialized services and the first argument is passed to the first specialized services in response to user selection of the first result, and wherein the second web application is configured to provide second specialized services and the second argument is passed to the second specialized services in response to user selection of the second result, wherein receiving the character stream of one or more non-completion characters comprises receiving a character stream of one or more non-completion characters that have been entered, by the user, to an address line of a web browser, generating the first result that includes the first argument and the identifier of the first web application comprises generating a mapping result that includes a first location and an identifier of a web mapping application, the mapping result including cartographic information, and rendering the first result in a manner enabling the user to perceive, before selecting the first result, the first argument and the identifier of the first web application comprises rendering the mapping result with an indication of an overview map that the user may select to display more detailed mapping information related to the overview map selected.

58. The method of claim 57 further comprising:
receiving one or more updates to the character stream;
analyzing the character stream using the updates to generate updated results that are responsive to the user's predicted interest; and
transmitting the updated results to enable the user to select one of the updated results.

59. The method of claim 57 wherein analyzing the character stream includes determining whether there is a sufficient amount of data in the character stream to generate accurate results, and, if there is a sufficient amount of data in the character stream to generate accurate results, analyzing the character stream to generate results that are responsive to the user's predicted interest.

60. The method of claim 59 further comprising delaying analyzing the character stream if there is not a sufficient amount of data in the character stream to generate accurate results.

61. The method of claim 59 wherein determining whether there is the sufficient amount of data in the character stream includes waiting until a predetermined number of non-completion characters has been received.

62. The method of claim 59 wherein determining whether there is the sufficient amount of data includes waiting until a predetermined amount of time has elapsed since the last character in the character stream has been received.

63. The method of claim 59 wherein determining whether there is the sufficient amount of data includes waiting until a predetermined number of non-completion characters has been received, unless a predetermined amount of time has elapsed since a new character in the character stream has been received.

64. The method of claim 57 wherein analyzing the character stream includes polling multiple databases to identify results from each of the multiple databases.

65. The method of claim 57 wherein receiving the character stream includes receiving the character stream from a web browser, the method further comprising enabling a service provider to configure the web browser to control an operating mode of the web browser.

66. The method of claim 65 wherein enabling the service provider to configure the web browser includes enabling the service provider to select one or more databases to be accessed.

67. The method of claim 65 wherein enabling the service provider to configure the web browser includes enabling the service provider to control a format with which the results are displayed.

68. The method of claim 65 wherein enabling the service provider to configure the web browser includes enabling the service provider to control a drop down menu to control the operating mode of the web browser.

69. The method of claim 57 further comprising:
analyzing the character stream to determine a user profile;
storing the user profile; and
using the user profile to analyze subsequent character streams received.

70. The method of claim 57 wherein analyzing the character stream includes analyzing the character stream to identify that mapping information is related to the character stream.

71. The method of claim 70 wherein identifying that mapping information is related to the character stream includes recognizing that a commonly used address term is present in the character stream.

72. The method of claim 71 wherein identifying that mapping information is related to the character stream includes recognizing that a zip code is present in the character stream.

73. The method of claim 71 wherein identifying that mapping information is related to the character stream includes recognizing that a state identifier is present in the character stream.

74. The method of claim 71 wherein identifying that mapping information is related to the character stream includes recognizing that a city identifier is present in the character stream.

75. The method of claim 57 wherein analyzing the character stream includes analyzing the character stream to identify that vendor information is related to the character stream.

76. The method of claim 75 wherein identifying that vendor information is related to the character stream includes identifying yellow page information related to the character stream.

77. The method of claim 75 wherein identifying that vendor information is related to the character stream includes identifying a category and a location present in the character stream.

78. The method of claim 57 wherein analyzing the character stream includes identifying a messaging label present in the character stream.

79. The method of claim 78 wherein identifying the messaging label includes determining that a user identifier is present in the character stream.

80. The method of claim 79 further comprising determining an online status of a user associated with the user identifier.

81. The method of claim 78 wherein identifying the messaging label includes recognizing that an '@' character appears in the character stream.

82. The method of claim 57 further comprising storing the results.

83. The method of claim 82 wherein storing the results includes storing results selected by the user.

84. The method of claim 82 further comprising:
receiving a second character stream of one or more non-completion characters where the non-completion characters indicate that additional characters may be received;
accessing stored results; and
relating the stored results to the second character stream.

85. The method of claim 84 further comprising transmitting the stored results when the second character stream indicates the user is requesting information related to the stored results.

86. The method of claim 57 further comprising validating Uniform Resource Locators (URLs) in the character stream.

87. A host that processes information received from a client to return results related to the information, the host comprising a processor configured to:
receive a character stream of one or more non-completion characters that indicate that additional characters may be received;
analyze the character stream to generate results that are responsive to a user's predicted interest, the results including a first result that includes a first argument and an identifier of a first web application and a second result that includes a second argument that is different from the first argument, and an identifier of a second web application, wherein the second web application differs from the first web application in function;
temporally store the first and second results;
render the first result in a manner enabling the user to perceive, before selecting the first result, the first argument and the identifier of the first web application, and
render the second result in a manner enabling the user to perceive, before selecting the second result, the second argument and the identifier of the second web application; and
transmit the results to enable the user to select among the first and second results, wherein the first web application is configured to provide first specialized services and the first argument is passed to the first specialized services in response to user selection of the first result, and
wherein the second web application is configured to provide second specialized services and the second argument is passed to the second specialized services in response to user selection of the second result,
wherein receiving the character stream of one or more non-completion characters comprises receiving a character stream of one or more non-completion characters that have been entered, by the user, to an address line of a web browser,
generating the first result that includes the first argument and the identifier of the first web application comprises generating a mapping result that includes a first location and an identifier of a web mapping application, the mapping result including cartographic information, and
rendering the first result in a manner enabling the user to perceive, before selecting the first result, the first argument and the identifier of the first web application comprises rendering the mapping result with an indication of an overview map that the user may select to display more detailed mapping information related to the overview map selected.

88. The host of claim 87 wherein the processor is further configured to:
receive one or more updates to the character stream;
analyze the character stream using the updates to generate updated results that are responsive to the user's predicted interest; and
transmit the updated results to enable the user to select one of the updated results.

89. The host of claim 87 wherein the processor is further configured to determine whether there is a sufficient amount of data in the character stream to generate accurate results, and, if there is a sufficient amount of data in the character stream to generate accurate results, analyze the character stream to generate results that are responsive to the user's predicted interest.

90. The host of claim 89 wherein the processor is further configured to delay analysis of the character stream when there is not a sufficient amount of data in the character stream.

91. The host of claim 89 wherein the processor is further configured to wait until a predetermined number of non-completion characters has been received.

92. The host of claim 90 wherein the processor is further configured to wait until a predetermined amount of time has elapsed since the last character in the character stream has been received.

93. The host of claim 90 wherein the processor is further configured to wait until a predetermined number of non-completion characters has been received, unless a predetermined amount of time has elapsed since a new character in the character stream has been received.

94. The host of claim 87 wherein the processor is further configured to:
analyze the character stream to determine a user profile;
store the user profile; and
use the user profile to analyze subsequent character streams.

95. The host of claim 87 wherein the processor is further configured to:
analyze the character stream to identify vendor information related to the character stream, and
return vendor information in the results.

96. The host of claim 95 wherein the processor is further configured to identify a category and a location present in the character stream.

97. The host of claim 87 wherein the processor is further configured to analyze the character stream for a messaging label present in the character stream.

98. A non-transitory computer-readable medium comprising:
means for receiving a character stream of one or more non-completion characters that indicate that additional characters may be received;
means for analyzing the character stream to generate results that are responsive to a user's predicted interest, the results including a first result that includes a first argument and an identifier of a first web application and a second result that includes a second argument that is different from the first argument, and an identifier of a second web application, wherein the second web application differs from the first web application in function;

means for temporally storing the first and second results;

means for rendering the first result in a manner enabling the user to perceive, before selecting the first result, the first argument and the identifier of the first web application;

means for rendering the second result in a manner enabling the user to perceive, before selecting the second result, the second argument and the identifier of the second web application; and means for transmitting the first and second results to enable the user to select from among the first and second results, wherein the first web application is configured to provide first specialized services and the first argument is passed to the first specialized services in response to user selection of the first result, and wherein the second web application is configured to provide second specialized services and the second argument is passed to the second specialized services in response to user selection of the second result, wherein means for receiving the character stream of one or more non-completion characters comprises means for receiving a character stream of one or more non-completion characters that have been entered, by the user, to an address line of a web browser, means for generating the first result that includes the first argument and the identifier of the first web application comprises means for generating a mapping result that includes a first location and an identifier of a web mapping application, the mapping result including cartographic information, and means for rendering the first result in a manner enabling the user to perceive, before selecting the first result, the first argument and the identifier of the first web application comprises means for rendering the mapping result with an indication of an overview map that the user may select to display more detailed mapping information related to the overview map selected.

* * * * *

UNITED STATES PATENT AND TRADEMARK OFFICE
CERTIFICATE OF CORRECTION

PATENT NO. : 8,005,919 B2  
APPLICATION NO. : 10/651303  
DATED : August 23, 2011  
INVENTOR(S) : Lara Mehanna et al.

It is certified that error appears in the above-identified patent and that said Letters Patent is hereby corrected as shown below:

Claim 40, col. 18, line 21, "receiving character" should read -- receiving characters --.

Claim 44, col. 19, line 27, insert -- of -- after -- display --.

Claim 91, col. 24, line 29, "claim 89" should read -- claim 90 --.

Signed and Sealed this  
Third Day of July, 2012

David J. Kappos  
*Director of the United States Patent and Trademark Office*